(12) United States Patent
Sahami et al.

(10) Patent No.: US 6,564,197 B2
(45) Date of Patent: *May 13, 2003

(54) METHOD AND APPARATUS FOR SCALABLE PROBABILISTIC CLUSTERING USING DECISION TREES

(75) Inventors: Mehran Sahami, Mountain View, CA (US); George Harrison John, San Mateo, CA (US)

(73) Assignee: E.piphany, Inc., San Mateo, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/304,509

(22) Filed: May 3, 1999

(65) Prior Publication Data

US 2003/0065635 A1 Apr. 3, 2003

(51) Int. Cl.$^7$ ................................. G06N 5/02

(52) U.S. Cl. .................. 706/55; 707/6; 703/2

(58) Field of Search .................. 706/55; 345/440; 382/224; 703/2; 707/6

(56) References Cited

U.S. PATENT DOCUMENTS

| | | | | |
|---|---|---|---|---|
| 5,787,274 | A | | 7/1998 | Agrawal et al. ............ 395/613 |
| 5,799,300 | A | | 8/1998 | Agrawal et al. ............... 707/5 |
| 5,809,499 | A | * | 9/1998 | Wong et al. .................... 707/6 |
| 5,930,392 | A | * | 7/1999 | Ho .............................. 382/224 |
| 6,128,587 | A | * | 10/2000 | Sjolander ....................... 703/2 |
| 6,233,575 | B1 | * | 5/2001 | Agrawal et al. ................ 707/6 |
| 6,278,464 | B1 | * | 8/2001 | Kohavi et al. ............... 345/440 |

FOREIGN PATENT DOCUMENTS

EP 0 067 057 12/1982 ......... G06F/15/336

OTHER PUBLICATIONS

Frakes, W.B. et al. 1992. Information Retrieval, *Data Structures & Algorithms*, pp. 419–442.

Fayyad, U.M. et al. 1996. Advances in Knowledge Discovery and Data Mining, pp. 152–181.

Gray, J. et al. 1996. Data Cube: *A Relational Aggregation Operator Generalizing Group–By, Cross–Tab, and Sub–Totals*. pp. 29–53.

(List continued on next page.)

*Primary Examiner*—Wilbert L. Starks, Jr.
(74) *Attorney, Agent, or Firm*—Bingham McCutchen LLP; Fabio E. Marino

(57) ABSTRACT

Some embodiments of the invention include methods for identifying clusters in a database, data warehouse or data mart. The identified clusters can be meaningfully understood by a list of the attributes and corresponding values for each of the clusters. Some embodiments of the invention include a method for scalable probabilistic clustering using a decision tree. Some embodiments of the invention, perform linearly in the size of the set of data and only require a single access to the set of data. Some embodiments of the invention produce interpretable clusters that can be described in terms of a set of attributes and attribute values for that set of attributes. In some embodiments, the cluster can be interpreted by reading the attribute values and attributes on the path from the root node of the decision tree to the node of the decision tree corresponding to the cluster. In some embodiments, it is not necessary for there to be a domain specific distance function for the attributes. In some embodiments, a cluster is determined by identifying an attribute with the highest influence on the distribution of the other attributes. Each of the values assumed by the identified attribute corresponds to a cluster, and a node in the decision tree. In some embodiments, the CUBE operation is used to access the set of data a single time and the result is used to compute the influence and other calculations.

59 Claims, 13 Drawing Sheets

OTHER PUBLICATIONS

Chow, C.K. 1968. IEEE Transactions On Information Theory, vol. IT–14, No. 3, *Approximating Discrete Probability Distributions With Dependence Trees*. pp. 462–467.

Fisher, D.H. 1986. Unsupervised Concept Learning and Discovery, *Knowledge Acquisition Via Incremental Conceptual Clustering*. pp. 267–283.

Chickering, D.M. 1996. Learning Bayesian Networks is NP–Complete. pp. 121–130.

John, G.H., Lent, B.1997. American Assciation For Artifical Intelligence, *SIPping From the Data Firehose*.pp. 199–201.

Sahami M. 1999. Using Machine Learning To Improve Information Access, *Dissertation, Stanford University Dec. 1998*.

McAlpine, G. et al., "Integrated Information Retrieval in a Knowledge Worker Support System", Proc. of the Intl. Conf. on Research and Development In Information Retrieval (SIGIR), Cambridge, MA, Jun. 25–28, 1989, Conf. 12, pp. 48–57.

Tsuda, K. et al., "IconicBrowser: An Iconic Retrieval System for Object–Oriented Databases", Proc. of the IEEE Workshop on Visual Languages, Oct. 4, 1989, pp. 130–137.

"Multiple Selection List Presentation Aids Complex Search", IBM Technical Disclosure Bulletin, vol. 36, No. 10, Oct. 1993, pp. 317–318.

Han, J.: "Towards On–Line Analytical Mining in Large Databases" SIGMOD Record, Mar. 1998, ACM, USA, vol. 27, No. 1, pp. 97–107, XP000980233, ISSN: 0163–5808.

* cited by examiner

METHOD AND APPARATUS FOR SCALABLE PROBABILISTIC CLUSTERING USING DECISION TREES

BACKGROUND OF THE INVENTION

1. Field of the Invention

This invention relates to the field of data analysis. In particular, the invention relates to the use of probabilistic clustering to produce a decision tree.

2. Description of the Related Art

Clustering

Identifying clusters helps in the identification of patterns in a set of data. As the size of sets of data such as databases, data warehouses, and data marts has grown, this type of knowledge discovery, or data mining, has become increasingly more important. Data mining allows patterns and predictions about these large sets of data be made.

Additionally, for many decision making processes, it is also important that the results be interpretable, or understandable. Complex formulas or graphical relationships may not be suited to allowing a human to gain insight as to the trends and patterns in a set of data.

For example, consider a financial institution that wants to evaluate trends in its loan practices. The actual set of data with loan information and lending decisions may have millions of data points. By identifying clusters, it is possible to identify groups of records that exhibit patterns, or strong internal consistencies, to one another. For example, one cluster of people who were approved for loans might be those with high incomes and low debts. While this is not a tremendous surprise, clustering can also identify non-obvious patterns in the data. The results may also have predictive value about future loans. For example, one cluster might reveal a high number of approved loans in one region, but not another similar region. This information may be useful in making future lending decisions.

When the clusters are interpretable, they can be used to drive decision making processes. However, if the resulting clusters are described in terms of complex mathematical formulas, graphs, or cluster centroid vectors, the usefulness of the clusters is diminished. An example of an interpretable cluster is residents of zip code 94304 (Palo Alto, Calif.). This cluster is easily understood without additional explanation. The cluster can be used to make decisions, adjust company strategies, etc. An example of a non-interpretable cluster is one defined mathematically, e.g. all data points within a given Euclidean distance from a centroid vector.

Several techniques have been used for clustering. The underlying concept behind clustering is that each of the data points in a set of data can be viewed as a vector in a high dimensional space. The vector for a data point is comprised of attributes, sometimes called features. For example, consider a set of data with two attributes for each data element: time and temperature. Thus, a data point X can be written as a 2-vector: $X=(x_1, x_2)$, where $x_1$ is time and $X_2$ is temperature. As the number of attributes increases, the vector increases in length. For n attributes, a data point X can be represented by an n-vector:

$$X=(x_1, x_2, \ldots, x_n).$$

In database terminology, the set of data could be a table, or a combination of tables. The data points are records, also called entries or rows. The attributes are fields, or columns.

k-means

One common technique for identifying clusters is the k-means technique. (See Krishnaiah, P. R. and Kanal, L. N., *Classification Pattern Recongition, and Reduction in Dimensionality*, Amsterdam: North Holland, 1982.) The k-means technique is iterative. The process starts with the placement of k centroids in the domain space. Then, the centroids are adjusted in an iterative process until their position stabilizes. The result is that the clusters are defined in terms of the placement of the centroids. FIG. 1 shows a set of clusters defined by centroids through the k-means technique. The data points are indicated with "." in the two dimensional data domain space. The centroids are indicated with "x". The resulting clusters are formed by those data points within a certain distance of the centroids as indicated by the ellipsoids.

In order to position the centroids and define the clusters, the k-means technique relies on the existence of a similarity, or distance, function for the domain. For example, in a set of data with a domain comprising time and temperature data points, Euclidean distance can be used. In other cases, the Hamming distance is used. However, if the data set comprises discrete attributes, e.g. eye color, race, etc., no clear similarity function is available. This lack of domain independence for the k-means technique limits its application to data domains for which there are well defined similarity functions.

The clusters that result from the k-means technique are difficult to interpret. Because the cluster is defined by a centroid and a distance from the centroid, it is not easy to interpret the results. Returning to the example of loan approval data for a bank, the resulting report would be a list of centroids and distances from the centroids for bank loan data points. The contents of the clusters would not be apparent. This type of information is not easily used to drive decision making processes, except perhaps after further computer analysis.

The k-means technique is also fairly computationally expensive, especially given that additional computational resources will have to be used if any analysis of the clusters is required. In big-O notation, the k-means algorithm is O(knd), where k is the number of centroids, n is the number of data points, and d is the number of iterations.

Hierarchical Agglommerative Clustering

Another prior art technique is hierarchical agglommerative clustering (HAC). (See Rasmussen, E. Clustering Algorithms. In *Information Retrieval: Data Structures and Algorithms*, 1992.) The basic idea behind HAC is that the clusters can be built in a tree-like fashion starting from clusters of one data point and then combining the clusters until a single cluster with all of the data points is constructed. FIG. 2 illustrates the clusters generated by HAC. The process is as follows, each data point is placed into a cluster by itself, shown by circles surrounding the single data point in FIG. 2. Then, at the next step, a similarity, or distance function is used to find the closest pair of smaller clusters, which are then merged into a larger cluster. The resulting clusters are junctions in the dendogram shown in FIG. 2. The process of combining clusters is continued as the tree is built from the bottom to the top as indicated by the arrow in FIG. 2 showing the flow of time.

As in the k-means technique, a similarity, or distance, function is needed. Therefore, HAC cannot be used on data domains with discrete attributes without a suitable distance function. Also, as in the k-means technique, the resulting clusters are not interpretable, other than by their centroids. For example, turning to the clusters developed in FIG. 2, if the user decided that they wanted to consider four clusters, they would select the stage of the process where four clusters existed. Those clusters though are not susceptible to meaningful interpretation except perhaps through further computer analysis. Also, HAC is computationally expensive, $O(n^2)$, where n is the number of data points.

Returning to the example of loan approval data for a financial institution, knowing that there are two clusters, one with these five million data points and the other with seven million does not convey much, or perhaps any, meaningful information to a human. That is because the clusters produced by HAC are defined in terms of centroids like in k-means.

AutoClass

Another prior art technique is AutoClass, developed by NASA. (See Cheeseman, P. and Stutz, J. Bayesian Classification (AutoClass): Theory and results. In *Advances in Knowledge Discovery and Data Mining*. AAAI Press 1996.) Unlike k-means and HAC, AutoClass can work on domains with discrete attributes and is domain independent because no domain specific similarity functions are required. The concept behind AutoClass is to identify k distributions, e.g. the n-dimensional Gaussian distribution, and fit those k distributions to the data points. The model builds up using multiple values of k in successive loops through the process until the fit of the distributions to the data sets can not be improved by adding additional distributions. During each pass, every record in the set of data must be accessed. Further, during each pass, data must be maintained for each data point about which of the distributions the data point is in.

FIG. 3 shows a possible mixture model that may be found after applying the AutoClass technique. The data set is shown as a solid line distributed across the domain. The dashed lines indicate the three distributions currently fit to the data. The number of distributions is the number of clusters. In FIG. 3, there are three clusters.

The results of AutoClass can be extremely difficult to interpret. Although FIG. 3 shows a clean separation between the three distributions, the distributions actually extend in both directions at very low levels. Thus, to answer questions about the contents of a cluster, you get a conditional probability: P(blue eyes|cluster 1)=0.9, etc. However, even in this simple one-dimensional data set of eye colors, the P(blue eyes|cluster 2) will be non-zero as well. For higher dimensional data sets, the results are even more difficult to interpret. This lack if interpretability reduces the usefulness of AutoClass in understanding data sets.

Thus, like k-means and HAC, AutoClass results are difficult because the clusters are not easily defined by a logical rule, but are rather expressed in terms of conditional probabilities. This makes it extremely difficult to use the generated results to drive decision making, make predictions, or identify patterns without further analysis.

AutoClass is more computationally expensive then either k-means or HAC. AutoClass is O(nkdv), where n is the number of data points, k is the number of distributions, d is the number of iterations for each model, and v is the number of models, or different k values considered. Further, this big-O notation does not take into account the heavy data access costs imposed by AutoClass or the additional storage requirements.

COBWEB

The previously discussed techniques were all oriented towards clustering entire sets of data. COBWEB is an online, or incremental approach to clustering. FIG. 4 shows a COBWEB tree structure with clusters. The clusters are the nodes of the tree. FIG. 4 shows a new data point, X, to be added to the data set. COBWEB is based on a probability distribution between the nodes of the tree. Because of the incremental nature of the technique, there are a number of special cases to handle merging and splitting of tree nodes based on subsequently received data.

Like AutoClass results, the clusters are defined by conditional probabilities that are not easily interpreted. Also, the performance of the COBWEB algorithm is sensitive to tree depth, thus if the initial data inserted into the tree is not representative of the whole tree, the algorithm performance may degrade. The predicted big-O time to add a single object is $O(B^2 \log_B n \times AV)$, where n is the number of data points, B is the average branching factor of the tree, A the number of attributes, and V is the average number of values per attribute.

COBWEB results are not easily used to drive decision making processes, or to identify patterns in a set of data, or to predict trends in the set of data. The conditional probabilities make interpreting the results particularly difficult to interpret. Also, because COBWEB has a certain sensitivity to the initial data points, the developed clusters may reflect clusters that are not formed on the most significant attributes. For example, if the initial thousand points in a set of data with ten million points reflect mostly rejected loans, the tree structure may become imbalanced as the remainder of the data points are added. Thus, in addition to being difficult to interpret, the nature of the identified clusters may be skewed based on the initial data.

The prior art systems do not provide a clustering technique that produces interpretable clusters, is scalable to large data sets, e.g. fast, and has domain independence. Accordingly, what is needed is a clustering technique that produces interpretable results, scales to handle large data sets well, and is domain independent. Further, what is needed is the ability to apply the clustering technique to data marts and data warehouses to produce results usable in decision making by the identification of meaningful clusters.

SUMMARY OF THE INVENTION

Some embodiments of the invention include a method for scalable probabilistic clustering using a decision tree. The method runs in time that is linear with respect to the number of data points in the set of data being clustered. Some embodiments of the invention can be run against a set of data such as a database, data warehouse, or data mart without creating a significant performance impact. Some embodiments of the invention access the set of data only a single time.

Some embodiments of the invention produce interpretable clusters that can be described in terms of a set of attributes and attribute values for that set of attributes. In some embodiments, the cluster can be interpreted by reading the attribute values and attributes on the path from the root node to the node of the decision tree corresponding to the cluster.

In some embodiments, it is not necessary for there to be a domain specific similarity, or distance function, for the attributes.

In some embodiments, a cluster is determined by identifying an attribute with the highest influence on the distribution of the other attributes. Each of the values assumed by the identified attribute corresponds to a cluster, and a node in the decision tree. For example, an attribute for gender might have the values "male", "female", "no response". Thus, if the gender attribute has the highest influence on the distribution of the remaining attributes, e.g. number of dresses purchased attribute, etc., then three clusters would be determined: a gender="male" cluster, a gender="female" cluster, and a gender="no response" cluster.

In some embodiments, these clusters are further refined by recursively applying the method to the clusters. This can be done without additional data retrieval and minimal computation.

In some embodiments, subsetting can be used to combine clusters. For example, the income attribute might have two values, one for "$10,000 to $20,000" and another for "$20,000 to $30,000". However, the similarities between data points with those two distinct values for income might be great enough that instead of treating the two values as two separate clusters, they instead are subsetted into a single cluster.

In some embodiments, feature elimination can be used to eliminate from consideration attributes that have highly uniform distributions. In some embodiments, the entropy of each attribute is computed to determine the uniformity of the distributions of the attributes. For example, in a set of data with several hundred attributes, feature elimination can be used to eliminate those features that would not play significant factors in clustering.

In some embodiments, the CUBE operation is used to access the set of data a single time.

DETAILED DESCRIPTION

A. Concepts

Figure 1:
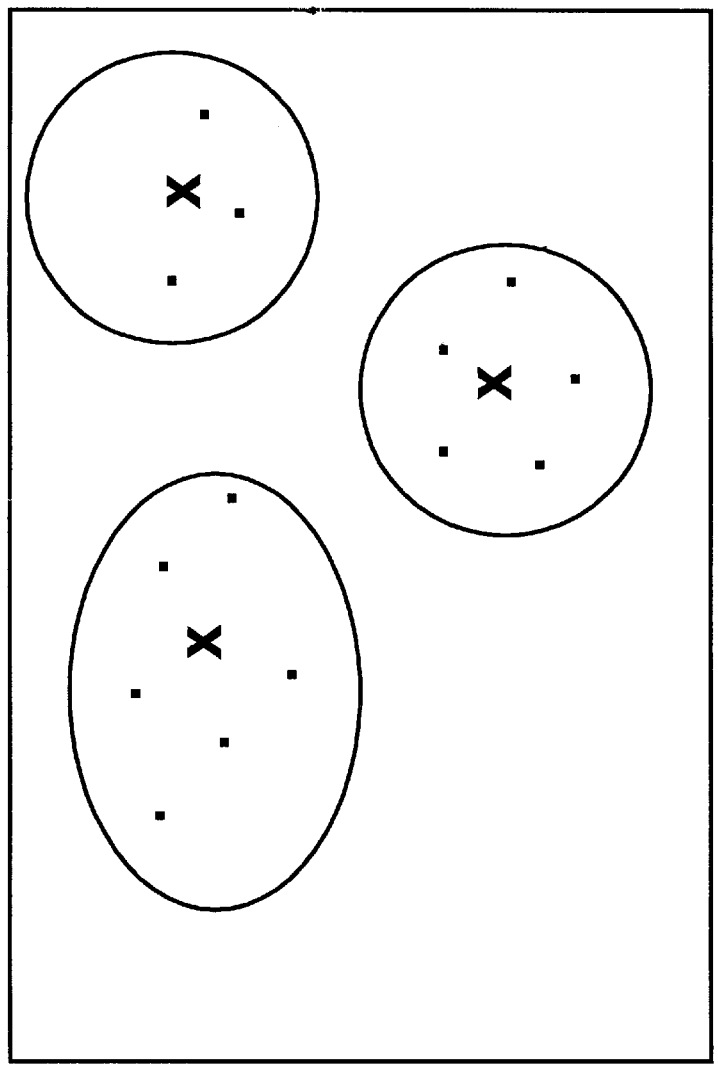
FIG. 1 illustrates the centroids and clusters determined by the k-means algorithm on a data set with two attributes and k=3.
Figure 2:
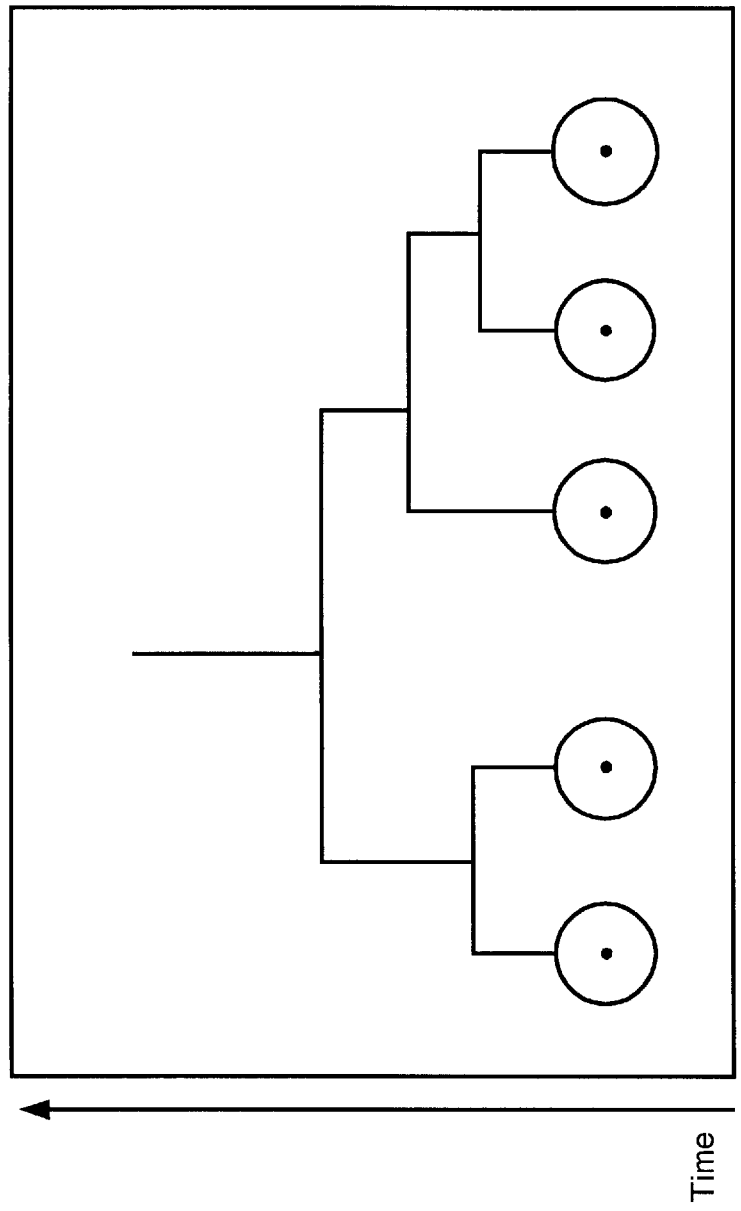
FIG. 2 illustrates the clusters determined by the hierarchical aglommerative clustering (HAC) algorithm.
Figure 3:
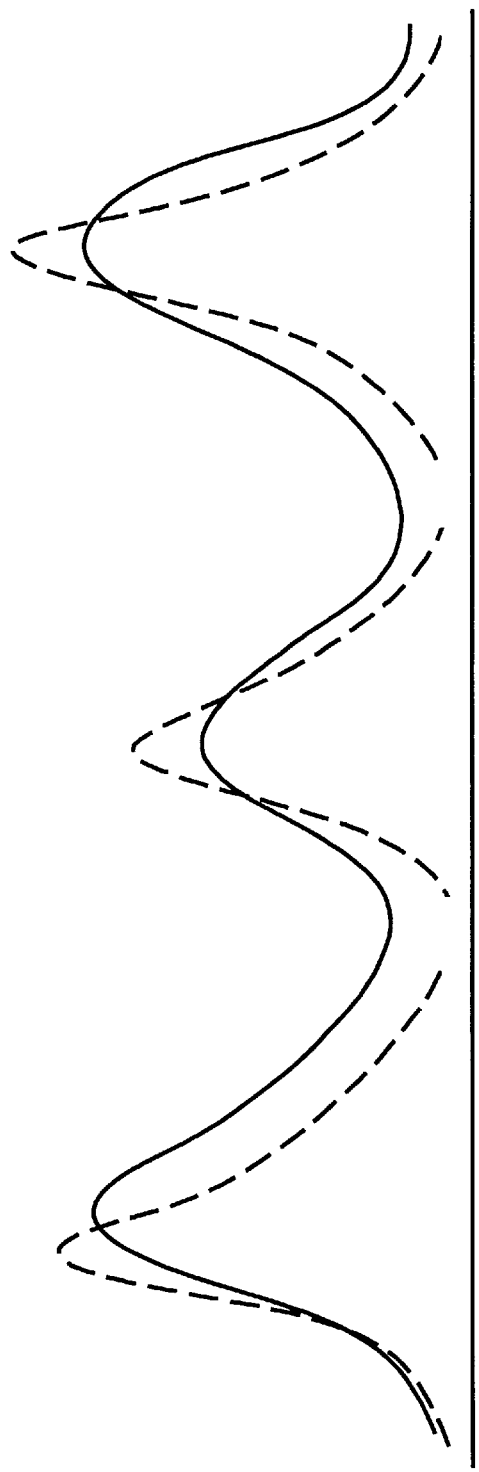
FIG. 3 shows a possible mixture model that may be found after applying the AutoClass technique.
Figure 4:
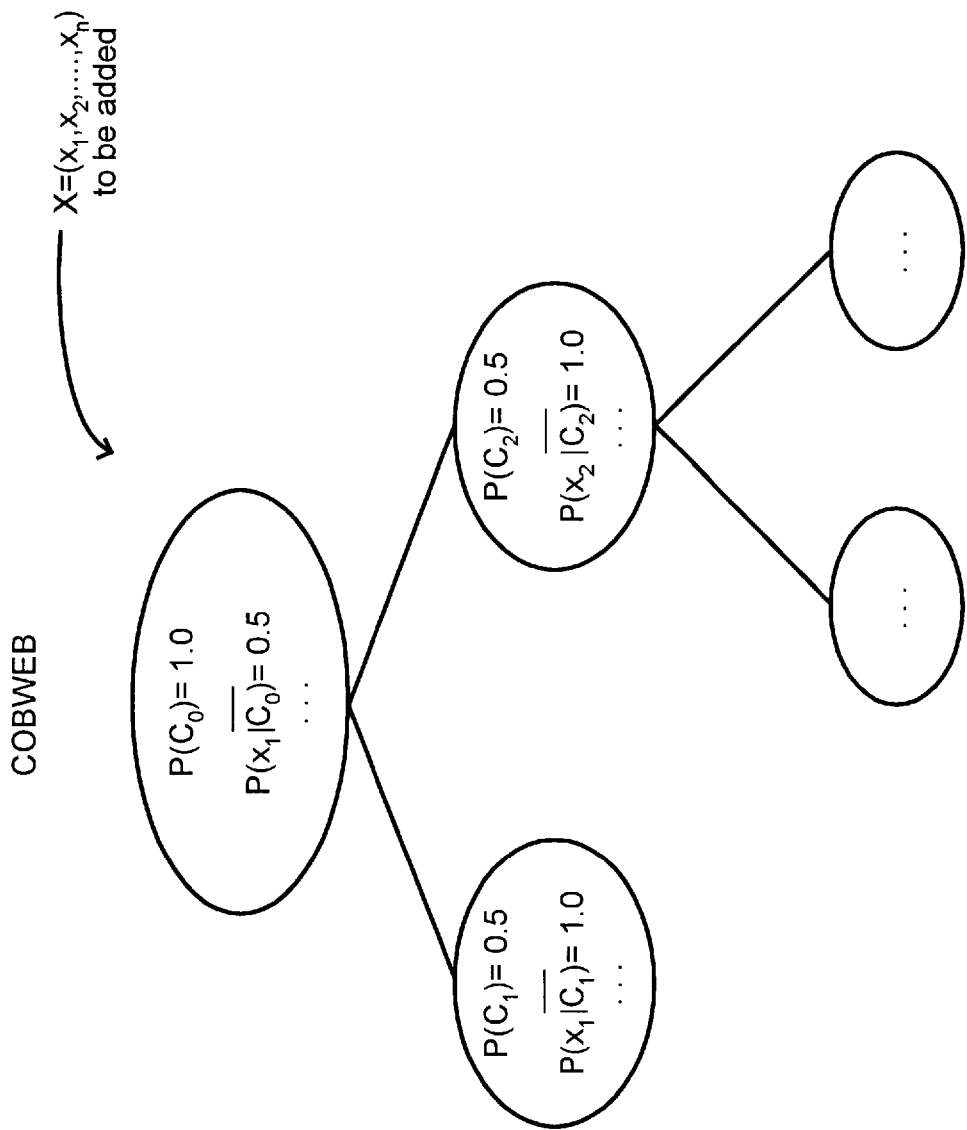
FIG. 4 illustrates the clusters determined by the COBWEB algorithm just prior to the insertion of a new element.

In some embodiments of the invention, a method of generating an interpretable cluster using probabilistic techniques and a decision tree is provided. The method can operate on a set of data such as database, or other source of data.

One application of this method is to generate interpretable clusters from a data mart or data warehouse. This is a type of data mining, or knowledge discovery. Data mining is an important part of corporate strategies underlying the drive towards developing data warehouses and data marts. By using data mining to uncover patterns and being able to predict future results from the data warehouse or data mart, the company can position itself strategically.

Thus, the ability of decision makers to understand the results of data mining, or knowledge discovery, is an element in the usefulness of a data mining tool. Techniques that identify abstract, or complex mathematical, patterns are not valuable to decision makers. Thus, the interpretable clusters produced should be understandable to a decision maker and usable without additional computer analysis.

The following subsections explain the principal concepts and operations used by the method according to some embodiments of the invention.

1. Data Retrieval: The Cube Operation

Some embodiments of the invention use the CUBE operation to retrieve information about the set of data. By using the CUBE operation, the speed of some embodiments is greatly improved. Specifically, for many sets of data, only a single access is needed to the data points.

Many modern database systems support the CUBE operation, still more support the GROUP-BY operation. When both operations are available for accessing the set of data, some embodiments use a single CUBE operation in preference to multiple GROUP-BY operations. Other embodiments perform GROUP-BY operations as needed to receive the necessary data.

In other embodiments, the data retrieval is done in steps. Because of the large table generated by a CUBE operation with many attributes, sometimes called features or fields, it may be necessary to combine a cube operation with GROUP-BY operations.

When neither operation is available, the necessary probabilities can be computed by multiple accesses to the set of data.

The result of a CUBE operation is an n-dimensional table where the axes are the attributes, $x_1$ to $x_n$. There is one entry on the $x_i$ axis for each value the $x_i$ attribute can assume plus an extra entry for the "*", or do not care entry. For example, in a set of data with three attributes, $x_1$, $x_2$, and $x_3$, each of which can assume only two values, the result of the CUBE operation is a three-dimensional table with three entries along each axis.

On the $x_1$ axis, there would be three entries: $\{a, b, *\}$. On the $x_2$ axis: $\{c, d, *\}$. On the $x_3$ axis: $\{e, f, *\}$. A single operation can then be used to look up the number of data points where ($x_1$=a, $x_2$=c, $x_3$=*), the corresponding cell in the matrix would contain a number, e.g. ten. That indicates there are ten data points in the set of data where $x_1$=a and $x_2$=c, the value of the $x_3$ attribute is ignored.

The do not care entry is useful in probabilistic algorithms because the frequency of different attribute values is easily computed. For example, the probability that $x_1$=a is:

$$P(x_1 = a) = \frac{(x_1 = a, x_2 = ^*, x_3 = ^*)}{(x_1 = ^*, x_2 = ^*, x_3 = ^*)},$$

which can be computed by retrieving two entries from the result of a CUBE operation.

2. Mutual Information

A good decision tree for identifying clusters will identify those attributes that have the highest influence on the distribution of the remaining elements. Actually solving this probabilisitc problem optimally is NP-hard. Therefore, it is necessary to identify a tractable approach that produces good results. One such approach is to select a tree structure and use the mutual information between pairs—and only pairs—of attributes to generate the decision tree.

The mutual information between a pair of attributes as given by Equation 1.

$$MI(x_i, x_j) = \sum_{a,b} P(x_i = a, x_j = b) \log \frac{P(x_i = a, x_j = b)}{P(x_i = a)P(x_j = b)} \quad (1)$$

Where a $\in$ {attribute values of $x_i$} and b $\in$ {attribute values of $x_j$} All of the required values can be obtained from the result of the CUBE operation. If the CUBE operation is not available, results from multiple GROUP-BY operations and/or multiple passes through the set of data can be used.

The properties of the mutual information are that it is high when two attributes have a strong effect on one another, i.e.

correlation, and low when they have a minimal effect on one another. The maximum value for the mutual information of a pair of two attributes is one and the minimum value is zero.

Regardless of the number of iterations or recursive applications, the CUBE operation need only be performed once. For example, once the zip code attribute has been used for clustering, narrower clusters can be defined off of the different clusters defined by the zip code attribute. However, as those additional clusters are defined, no additional information needs b extracted if a single CUBE operation was used.

As subsequent clusters are defined, the mutual information will be computed as a conditional probability based on the clusters that have already been identified: $MI(x_i, x_j|Z)$, where Z is the set of features previously split on, e.g. $Z=\{x_m=a, x_n=d\}$.

3. Influence

In building the decision tree, we use the mutual information to determine the influence of each attribute. To select an attribute to split on, it is desirable to select the attribute with the highest mutual information across all of the other attributes, e.g. the influence of the attribute, as shown in Equation 2.

$$Influence(x_i) = \sum_{j \neq i} MI(x_i, x_j) \quad (2)$$

The attribute with the highest influence is then selected. The selected attribute is the one upon which the remaining attributes are most heavily dependent.

One optimization is to sum over the k-maximal terms instead of all of the other attributes in computing the influence. In this embodiment, only the k mutual influence values with the highest values are summed for each attribute.

On successive applications of Equation 2 to compute the influence, care should be taken to not sum over attributes that have already been used in splitting the set of data to define clusters. For example, after selecting the zip code attribute to use for splitting, successive computations of the influence score should not include the zip code attribute in the summation. Thus if the remaining attributes are gender, age, and income, then only the mutual influence values for those three remaining attributes will be used in computing the influence on a cluster off of the zip code attribute.

4. Stopping Conditions

In a given set of data there may be dozens of attributes, or more. Given the computational costs and practical concerns, it may not be desirable to create a decision tree that splits on all of the attributes. Some practical concerns may include wanting clusters of sufficient size, e.g. at least a few hundred data points in each cluster. Several stopping conditions are described in Table 1 along with a brief explanation of each.

TABLE 1

| Condition | Comments |
| --- | --- |
| Split on m-attributes | This stopping condition ensures that each path through the decision tree is at most m long. Useful when you want to limit the results to the m most important attributes in a set of data. |
| Threshold on influence score | For example, it could be required that to further subdivide a cluster, the influence score of the highest remaining attribute had to be at least 0.05, or 0.1, etc. Useful to |

TABLE 1-continued

| Condition | Comments |
| --- | --- |
| | prevent clustering on insignificant attributes and the creation of numerous clusters with little relevance. |
| Percentage of Data Remaining/Absolute Amount of Data Remaining | Both of these stopping conditions operate similarly. The idea is to stop operating on a node in the decision tree when less than a predetermined percentage, e.g. 5%, of the data, or a predetermined number of data points, e.g. 10,000, is remaining. Useful for ensuring that clusters are significant in size. |
| Subset all values | This stopping condition can be used in conjunction with subsetting. After selecting an attribute to split on, if all of the resulting clusters are merged during subsetting, then no further clustering is performed on this branch of the tree. |

In some embodiments, the user can select from any of the above stopping conditions. In others, a predetermined stopping condition is used.

5. Subsetting

One enhancement that can improve the quality of the decision tree is to form subsets. Once an attribute $x_i$ has been selected based on the influence for $x_i$, the attribute with which $x_i$ had the highest mutual information value is also known, e.g. $x_j$. By writing out vectors for the frequency of the various attribute values of $x_j$ for each of the attribute values of $x_i$, a decision can be made as to whether subsetting is appropriate.

For example if age was the attribute with the highest influence, then it formed a node of the decision tree. Then, the most closely correlated attribute is the attribute where MI(age, other attribute) is highest, e.g. income.

Then for each value of the age attribute, e.g. under 30, a vector can be written of the probability of each of the values of the income attribute. For example, the income attribute might have three values: under $50K, $50K to $150K, and over $150K. Thus, the probability vector for the age attribute having the value under 30 and might be: <0.5, 0.4, 0.1>. This vector is read to mean that half of the data points whose age attribute has the value under 30 have an income attribute with a value of under $50K.

The vectors can also be determined for the other values of the age attribute. For example, the 30 to 50 value of the age attribute could have the vector <0.3, 0.7, 0.0> and the over 50 value of the age attribute could have the vector <0.45, 0.45, 0.1>.

The next step is to determine if any of the age attribute values should be merged, or subsetted, based on these vectors. This can be done by computing the Bhattacharyya distance between the two vectors. Other measures can be used such as the relative entropy, or the KL-distance, or some other measure. In the case of the Bhattacharyya distance, if the resulting distance between the probability vectors exceeds a predetermined value, then the nodes can be combined.

Here, the under 30 and over 50 values of the age attribute might exceed that value because they are very closely correlated on income. Accordingly, the under 30 and over 50 nodes of the decision tree could be combined and further operations would work on the combined cluster, or node, where the value of the age attribute is either under 30 or over 50.

6. Feature Elimination: Entropy

Because a set of data can have a number of attributes, it may be desirable to eliminate some of them. In some embodiments, a user or program can select a predetermined set of features to eliminate. However, these decisions are typically not driven by the actual distribution of the set of data.

Automated feature elimination allows the rapid elimination of features that are not useful in identifying clusters. This can be done very quickly using the entropy as defined by Equation 3.

$$Entropy(x_i) = \sum_{a \in \{values\ of\ x_i\}} P(x_i = a) \log P(x_i = a) \quad (3)$$

All of the necessary values for computing the entropy are available in the CUBE operation results.

When the entropy of an attribute is low, it has a fairly skewed distribution. In contrast, when the entropy of an attribute is high, the distribution is fairly uniform. By eliminating attributes with high entropy that are not likely to produce interesting clusters, the number of attributes under consideration can be reduced.

In some embodiments, a predetermined value can be used to automatically eliminate attributes with higher entropies. Alternatively, the m attributes with the highest entropies can be eliminated. Alternatively, the j attributes with the lowest entropies can be the only ones used in clustering.

B. Method for Probabilistic Clustering with a Decision Tree

Figure 5:
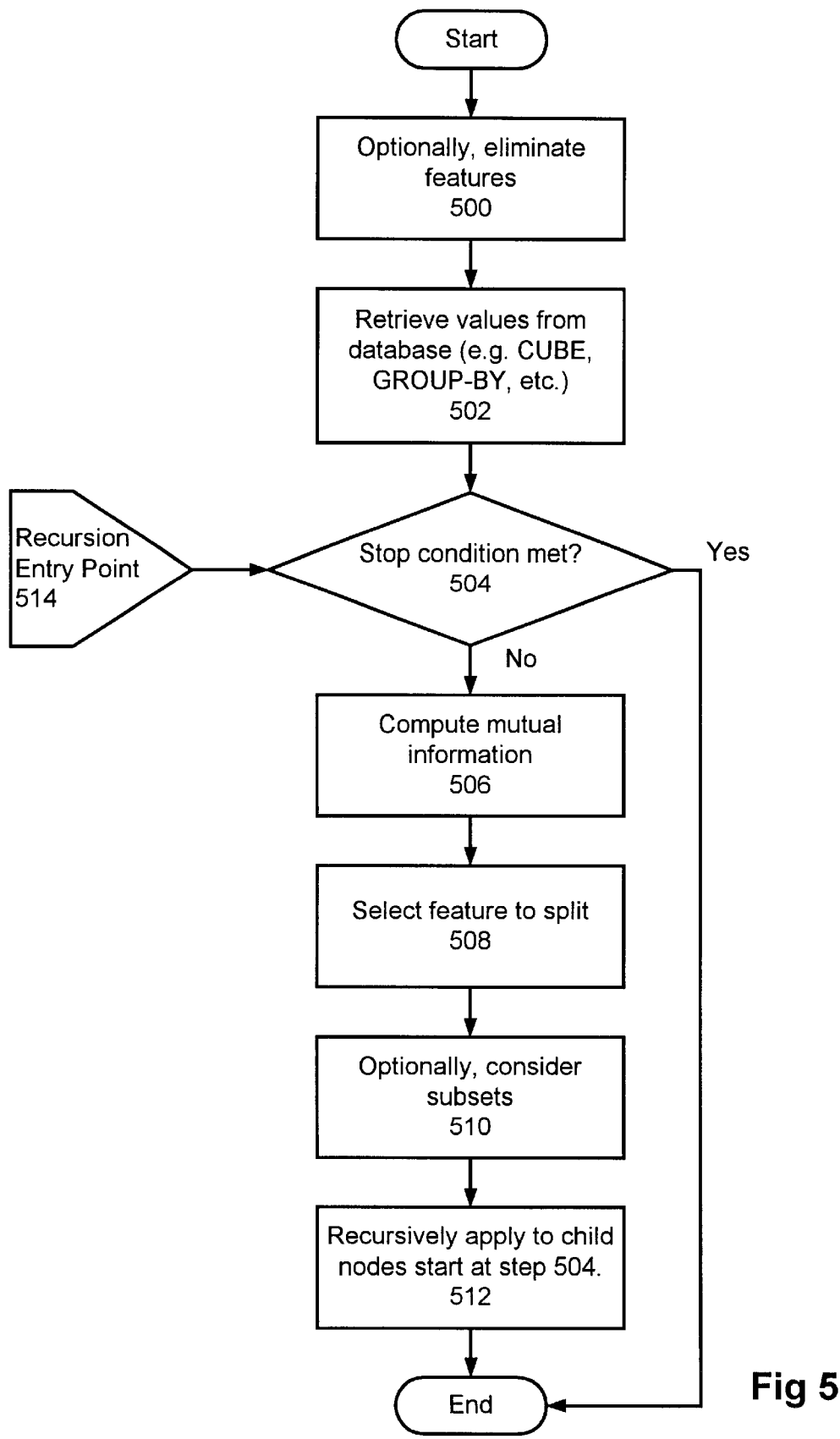
FIG. 5 is a flow chart of a method of constructing a decision tree according to one embodiment of the invention.

FIG. 5 is a flow chart of a method of constructing a decision tree according to one embodiment of the invention. The process described will be explained with reference to the portion of a decision tree shown in FIG. 6.

In this example, the data set includes information about donors to an institution. The attributes are: age ($x_1$), donor status ($x_2$), income ($x_3$), gender ($x_4$), and zip code ($x_5$).

The process starts at step 500, with feature elimination. This is an optional step that can be skipped. If feature elimination is used, then the method described above for feature elimination can be used. Typically feature elimination is used on data sets with a large number of attributes. By eliminating features that are not significant for clustering purposes, the whole process is faster and the clusters are formed on the most meaningful features.

Feature elimination does involve some retrieval of data, therefore it may occur after step 502. When, as here, feature elimination occurs before retrieving the data, some data retrieval may occur to compute the entropy of the attributes. In some embodiments, the GROUP-BY operation is used to retrieve the values necessary to compute the entropy of the attributes in step 500.

In this example, the institution is a local charity with most of its contributors in only one zip code. In step 500, the entropy value for the zip code attribute will be low, reflecting its non-uniformity. In this example, a predetermined threshold has been established and attributes with an entropy higher than the threshold are eliminated. In this example, the entropy for the zip code attribute within the example set of data does not exceed the threshold and zip code will not be eliminated as an attribute.

Next, at step 502, values are retrieved from the database. The entropy values used for feature elimination could be computed after step 502; however, one purpose of feature elimination is to avoid the need to perform large CUBE operations. Accordingly, step 502 typically occurs after feature elimination although it need not. If feature elimination is performed prior to step 502, the CUBE operation need only be performed on the remaining attributes.

In some embodiments, the relevant data is retrieved using a single CUBE operation. The CUBE operation has been described above. In some cases, the set of data is stored in an environment that does not support a CUBE operation, in those cases, multiple GROUP-BY operations or multiple accesses to the set of data can be performed. If the number of attributes is large enough, it may be necessary to combine a CUBE operation with GROUP-BY operations to retrieve all of the necessary data. In this example, the CUBE operation is used to retrieve the necessary values for the data points.

Next, at step 504, a check is made to see if the stop condition has been met, e.g. whether or not further clusters can be defined. Table 1 lists a number of stopping conditions. In this example, the split on m-attributes stopping condition is being used with m=2. This stopping condition has been selected so that the results are limited to the two most significant attributes for forming clusters in the set of data. If the stopping condition is met, the process ends. If this is a recursive call, the process may continue on other sibling nodes in the decision tree. If the stopping condition is not met, the process continues at step 506.

In this example, no splits have been made, so the process continues to step 506.

At step 506, the mutual information values are computed according to Equation 1. In this example, the mutual information values for each of the four remaining attributes: age, donor status, income, and gender are computed with the other remaining attributes. If a single CUBE operation was used to retrieve all of the necessary frequency information at step 502, then the mutual information values are computed a single time.

On subsequent calls, the conditional mutual information is computed. The conditional mutual information can be efficiently computed using the already retrieved results from the CUBE operation. If it was not possible to store the results of the CUBE operation for all of the necessary data, additional data retrieval may be necessary using GROUP-BY or CUBE operations to compute the conditional mutual information.

Next, at step 508, a feature to split the decision tree on is chosen, this is done by selecting the attribute with the highest influence as computed according to Equation 2 based on the mutual information values generated in step 506. In this example, the age ($x_1$) attribute has the highest influence and becomes the root node 602 of the partial decision tree 600.

Next, at step 510, subsetting is considered. This is an optional feature to improve the decision tree. In this example, subsetting is not performed.

Next, at step 512, the process is recursively applied to the child nodes. In this example, the age attribute has three possible values: under 30, 30 to 50, and over 50. A node is added to the decision tree off the root node 602 for each of these attribute values, e.g. the nodes 604–608. The clustering process is then applied recursively to each of the nodes. The recursive application can be in series or parallel. For example, a separate process, or thread, could be run in parallel on each of the nodes. On systems with multiple processors, this may improve the performance of the method.

When the clustering is being performed recursively, only the leaf nodes of the decision tree are output as the clusters 610–612. However, all of the nodes of the decision tree except for the root node are clusters as they identify a subset of the set of data sharing similar information. Therefore, a single iteration of the process of FIG. 5 determines multiple clusters that can be further refined, one cluster for each attribute value of the selected attribute. If subsetting was performed, the number of clusters may be less, depending on what subsets were formed.

For example, the clustering process for the node 608 could occur before the clustering for the node 604. Also, the recursive application of the clustering process can be done breadth first or depth first. In a breadth first embodiment, all nodes at the same level, e.g. the nodes 604–608, are determined before nodes at subsequent levels, e.g. the clusters 610–612. The choice as to whether breadth first or depth first recursion is used may depend on the type of information that a user wishes to see first. For example, in some embodiments, the user can select between the two methods.

In this example, the recursive application of the clustering process is depth first. Thus, the process first occurs on the node 604 and then on the children of the node 604, e.g. the clusters 610–612, and then on the node 606 and its children, etc.

The recursion entry point 514 shows that when the function is called recursively steps 500–502 can be skipped. In many cases, step 506 can be skipped if a single CUBE operation was used to retrieve all of the needed values from the database.

Figure 6:
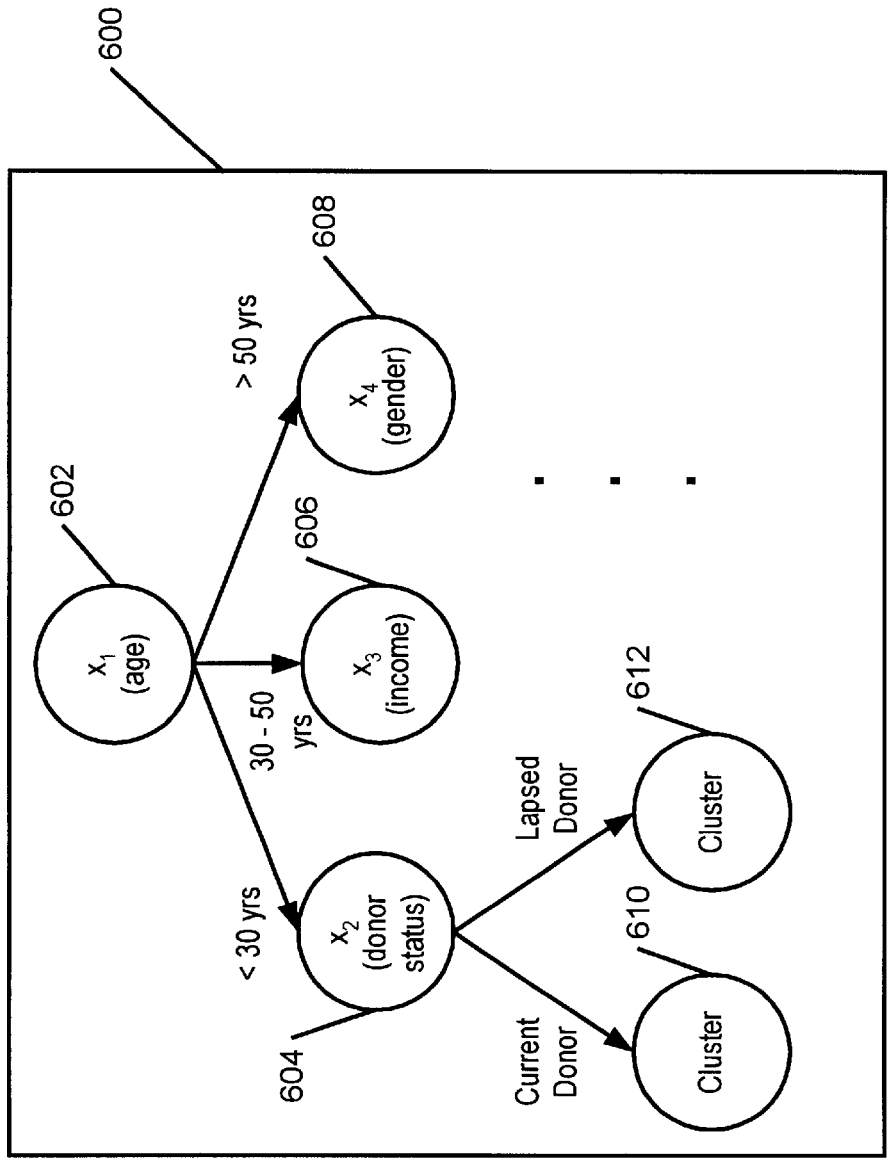
FIG. 6 illustrates a portion of a decision tree constructed using one embodiment of the invention.

Once the process has completed the recursive calls, a full decision tree is generated. FIG. 6 shows the portion of the decision tree 600 generated from the process. Notice that the subsequent splits after the split on the age attribute occur on different attributes: the node 604 is a split on donor status, the node 606 is a split on income, and the node 608 is a split on gender.

The leaf nodes in the decision tree are the clusters 610–612. Each cluster can be interpreted by simply reading the path from the root node 602 to the cluster. For example the cluster 610 comprises data points whose age is less than thirty and who are current donors. The clusters 610–612 are not probabilistically defined. They are exact descriptions of the clustered data points.

The computational performance of this method is extremely good, making it scalable to very large sets of data such as those found in databases, data warehouses and data marts. If the CUBE operation is used, the set of data is only accessed once and the number of comparisons is fairly small. In big-O notation, the method is $O(a^2nd)$, where a is the number of attributes clustering is performed on, n is the number of data points, and d is the number of nodes in the tree. If a and d are assumed constants, due to their small size relative to the size of n in a typical data mart, e.g. tens of millions of data points, the performance may be considered linear, or $O(n)$, in the number of data points.

A number of output formats can be used in interpreting the results. In some embodiments, the output includes the decision tree. The decision tree allows the different significant attributes to be viewed in a highly visual and interactive fashion.

Another output format is a number of standard query language (SQL) queries, one SQL query for each cluster. This is a useful output for retrieving one or more clusters from the set of data. Other query language outputs can also be supported.

Another output format is a two dimensional matrix of pie charts. In one axis, each attribute is listed, even, optionally, the eliminated attributes. In the other axis, there is an entry for the entire set of data and then another entry for each cluster. An example of this format is depicted using a sample set of data in Table 2.

|  | Age | Donor Status | Income | Gender | Zip Code |
|---|---|---|---|---|---|
| Data Set as a whole | Pie chart of Ages for set of data | Pie chart of Donor Status for set of data | — | — | — |
| Cluster 610 description | Pie chart of Age for cluster 610: 100% < 30 | Pie chart of Donor Status for cluster 610: 100% current donor | Pie chart of Income for cluster 610 | — | — |
| Cluster 612 description | Pie chart of Age for cluster 612: 100% < 30 | Pie chart of Donor Status for cluster 612: 100% lapsed donor | Pie chart of Income for cluster 610. | — | — |
| — | — | — | — | — | — |

Other representations can be used other than a pie chart, e.g. bar chart, textual descriptions, etc. The advantage of this display format is that it offers additional insight into the structure of the set of data based on the composition of the clusters.

For example, looking down the column for the income attribute, the differences between the income for the data points in the cluster 610 can be compared with that of the data as a whole and the other clusters.

Many other output options may be used. For example, in one embodiment the top k attributes that influenced the clustering can be listed along with the relative percentage of the influence of that attribute on the clustering. This is typically only computed at the root level of the decision tree, although it can be computed at any level. Equation 4 shows the formula for the relative influence:

$$Relative\ Influence(x_i) = \frac{Influence(x_i)}{\sum_j Influence(x_j)} \quad (4)$$

If the relative influence is being computed at levels other than the root level of the decision tree, the summation should be only over the remaining j attributes.

C. Example with a Web Browser Interface

FIGS. 7–13 illustrate the use of one embodiment of the invention via a web browser interface to a data mart. The web browser interface allows this embodiment of the invention to be accessed without knowledge of the underlying access mechanisms for the data mart. Further, the interface allows the data mart and data mining tools to be easily distributed to workstations across an organization. The clustering tool for data marts and data mining could be included with E.piphany e.4, from E.piphany, Inc., Palo Alto, Calif.

A data mart is a type of data warehouse, which itself is a type of database. Data marts and data warehouses both typically contain aggregate or summary data from other organization databases. The distinction between whether a particular database is called a data mart or a data warehouse depends on the needs the database is designed to serve. Generally, a database designed to address the needs of an organization or enterprise is termed a data warehouse. Whereas, a database designed to address a specific function or department's needs is termed a data mart.

In this example, our set of data accessed over the web is a data mart for a private college with an alumni office. The alumni office has constructed a data mart to address its departmental needs relating to raising money. The information in the data mart may come from a variety of sources including: an alumni database, other college databases, the college's data warehouse, survey responses, and outside data sources. One tool to assist in the creation and population of a data mart is EpiManager, from E.piphany, Inc., Palo Alto, Calif. Other tools are available and can be used as well. A data mart might have on the order of a hundred attributes. In this example, the alumni office data mart has only twelve attributes.

Figure 7:
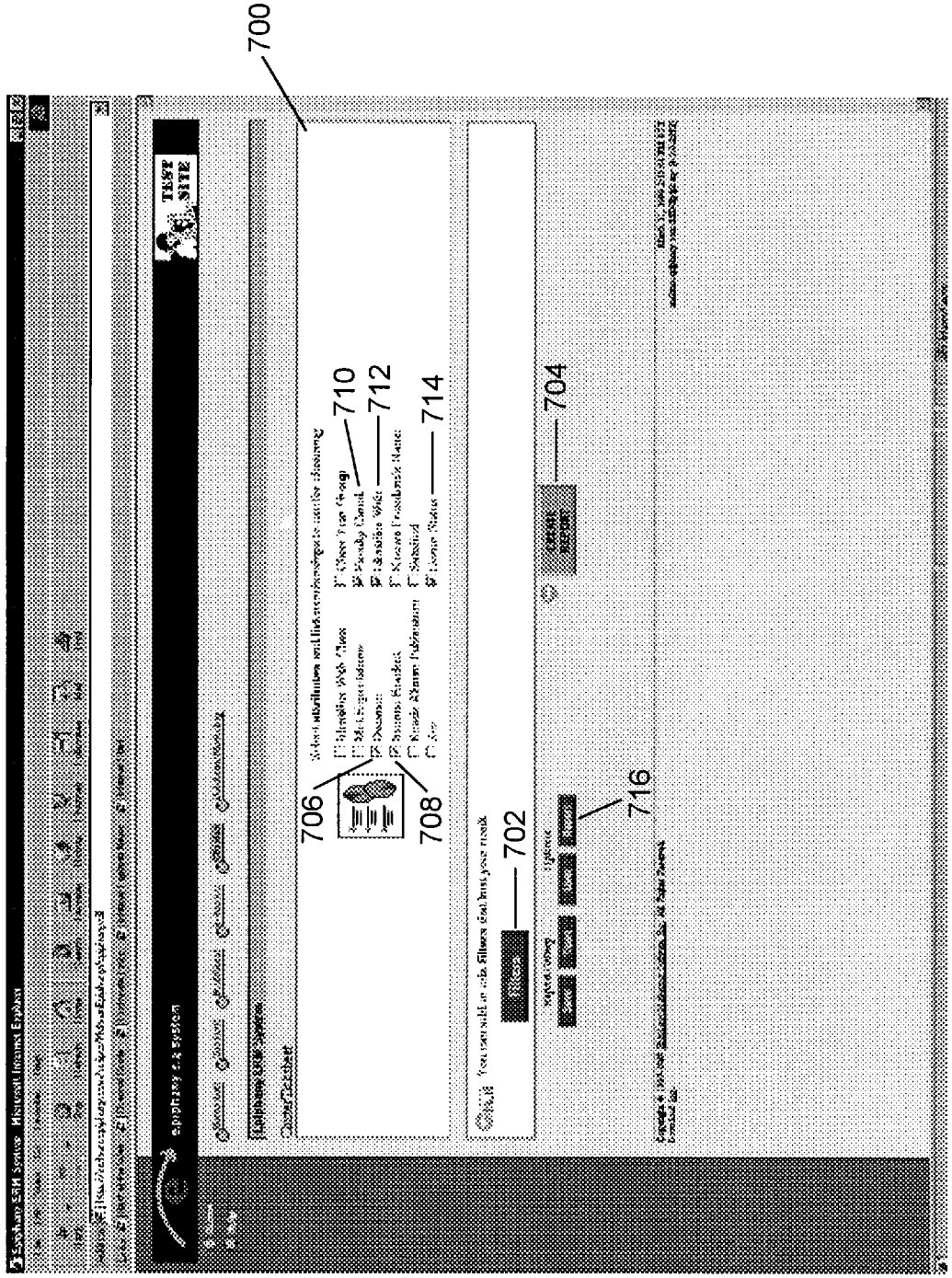
FIGS. 7–13 illustrate the use of one embodiment of the invention via a web browser interface to a data mart.

FIG. 7 shows a web browser interface included in an embodiment of the invention. FIG. 7 includes an attribute selection area 700. The attribute selection area 700 lists the attributes in the data mart along with a check box to indicate that clustering should be performed on the corresponding attribute. In some embodiments, the attribute selection area 700 lists only some of the attributes. In other embodiments, step 500, feature elimination, is performed to present only the top k attributes for selection in the attribute selection area 700.

In the alumni office data mart, the twelve attributes are: identifies with class, met expectations, distance, income bracket, reads alumni publication, sex, class year group, faculty cared, identifies with, knows president's name, satisfied, and donor status. Of those, five have been selected by checking the corresponding check box. Only the checked attributes will be used in clustering, here those are the distance attribute 706, the income bracket attribute 708, the faculty cared attribute 710, the identifies with attribute 712, and the donor status attribute 714. At this point, the create report button 704 could be selected to run the clustering process using the selected attributes.

The web browser interface offers an additional filtering option. This allows the user to work on a subset of the entire data mart by defining a filter. The filters button 702 accesses the filter option. In this example, the user signals on the filters button 702 and a window is displayed in the web browser to allow the definition of a filter.

Figure 8:
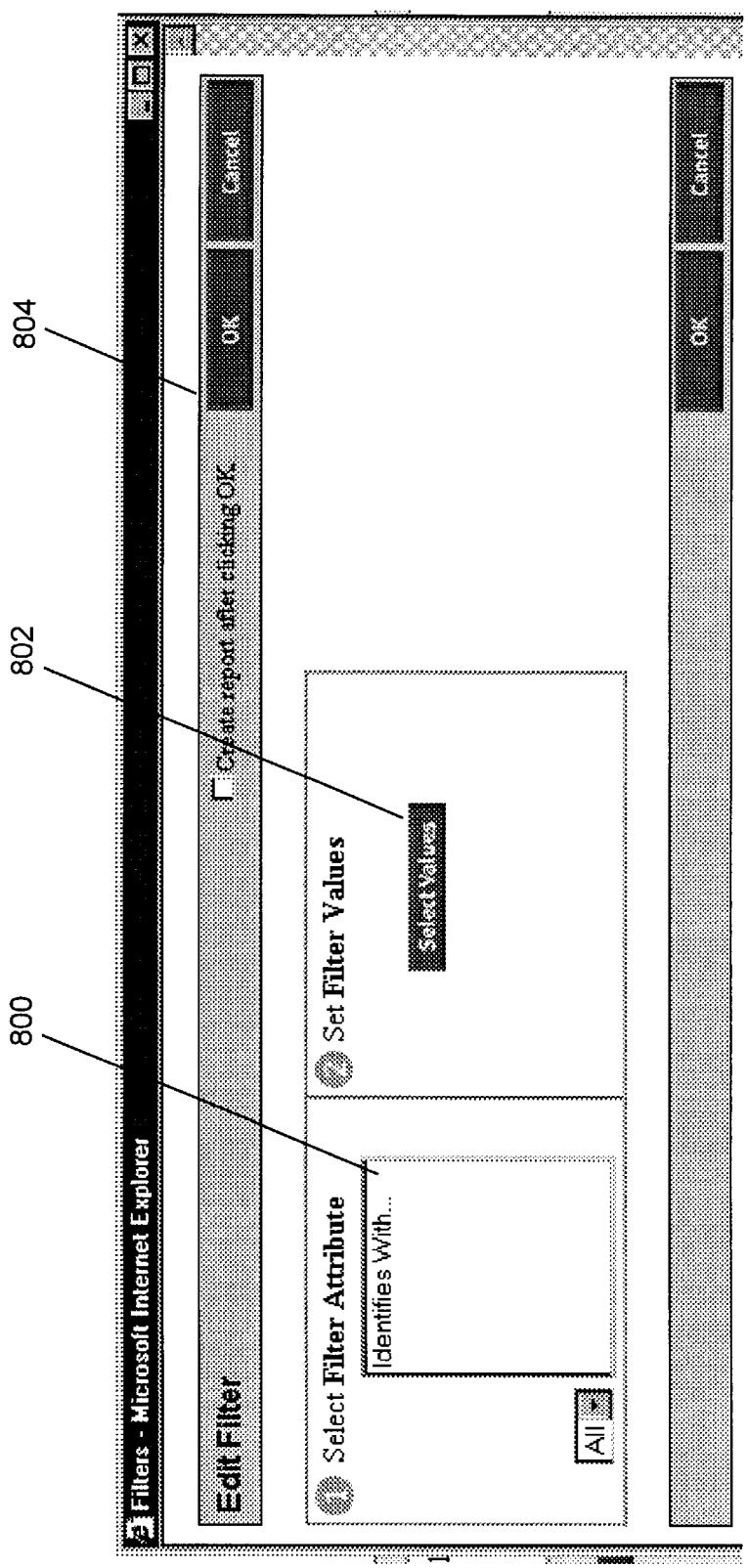

FIG. 8 shows the relevant portions of the filter definition window. The filter definition window includes a selection region 800, a select values button 802 and an OK button 804. The selection region 800 allows the selection of one or more attributes that will be used in defining the filter. The select values button 802 can be selected after one or more attributes are selected in the selection region 800. In this example, the user selects the "identifies with" attribute in the selection region 800 and then signals on the select values button 802.

Figure 9:
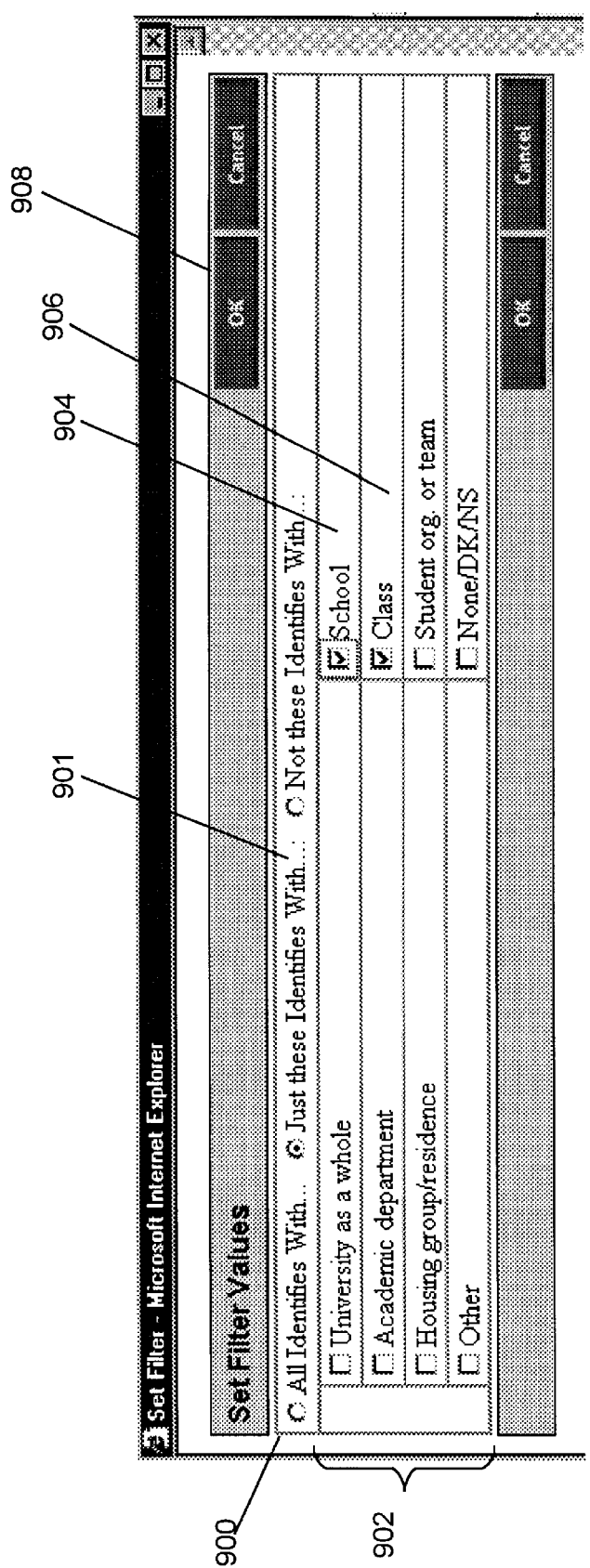

FIG. 9 shows the relevant portions of the select values window. The select values window allows the selection of values for each attribute selected in the selection region 800. For each attribute selected in the selection region 800, a filter type selection region 900 and a filter values selection region 902 are displayed. In this example, only the "identifies with" attribute was selected, so only one filter type selection region-filter values selection region pair is displayed.

For each value the attribute can assume, the filter values selection region 902 displays the value and a corresponding check box. The meaning of checking one of the check boxes is determined by the selection in the corresponding filter type selection region 900. Here, the matching filter type 901 is selected. With this filter type, only data points matching the checked values in the filter values selection region 902 will be used for clustering. The other filter types in this example are to include all values, e.g. ignore the check boxes in the filter values selection region 902, and to exclude data points matching the checked values in the filter values selection region 902.

In this example, the user has checked the check boxes corresponding to the school value 904 and the class value 906 for the "identifies with" attribute. Because the matching filter type 901 is selected, only records where the identifies attribute is set to school or class will be included in the clustering process.

The user can signal on the OK button 908 when she/he is finished. In some embodiments, the filters define an SQL query that is used to select the database records used for the CUBE operation and the clustering process. In some embodiments, the defined filters are displayed next to the filters button 702 in FIG. 7.

Figure 10:
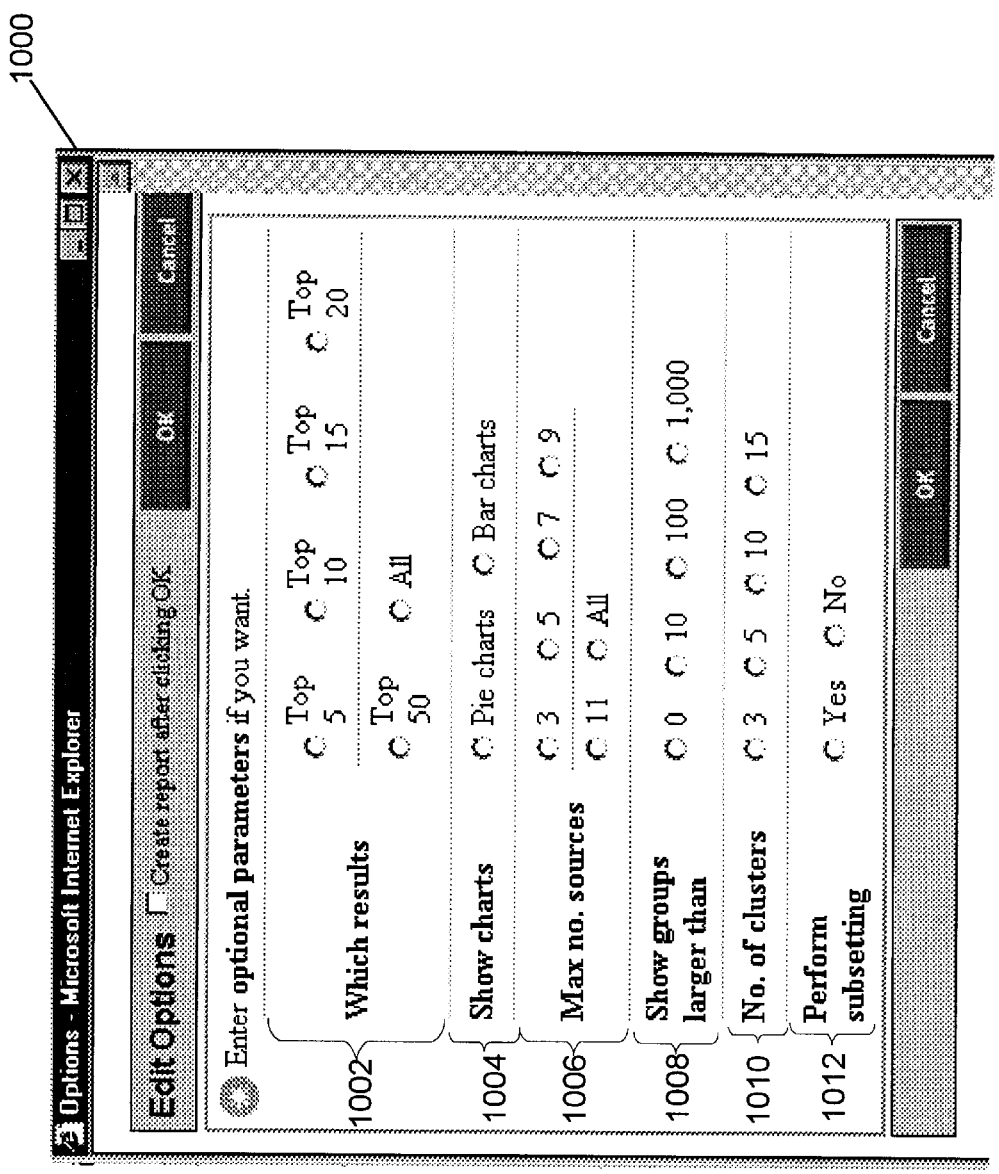

The browser interface also includes an options button 716 (FIG. 7). The options button 716 can be used to display a window for controlling the clustering process. FIG. 10 includes the options window 1000 that is displayed after signaling on the options button 716.

In this example, the options window 1000 includes fives sets of options. The which results option set 1002 controls how many clusters are included in the output. The setting for the which results option set 1002 does not effect the clustering process, but rather limits the output to the n largest clusters resulting from the process.

In some embodiments, a show charts option set 1004 allows the user to control whether the output will include pie or bar charts according to the layout shown in Table 2.

The maximum number of sources option set 1006 can be used to activate the feature elimination option at step 500 (FIG. 5). For example, if the maximum number of sources is set to three, then only the top three attributes of the attributes selected in the attribute selection area 700 will be used for clustering. Those three attributes can be identified using the three attributes with the lowest entropy values as computed by Equation 3.

The show groups larger than option set 1008 is used to limit the output display based on the number of data points in a cluster. Only groups larger than the selected size will be displayed in the output. The setting can also be used to control the stopping condition used at step 504. In this embodiment, the stopping condition is met if further clustering would reduce the size of the cluster below the setting indicated in the show groups larger than option set 1008.

In some embodiments, a number of clusters option set 1010 can be used to limit the total number of clusters created. This limits the number of resulting clusters to the number selected. In some embodiments, the clustering is performed breadth first when this option is selected.

The perform subsetting option set 1012 allows the user to control whether or not subsetting is performed at step 510.

Once the options have been adjusted, the user can signal on the create report button 704 to cluster the set of data according to the process of FIG. 5 and display the results. The results can be displayed with the clustering options or in a separate window. Here, the results are displayed directly below the report options as shown in FIG. 11.

Figure 11:
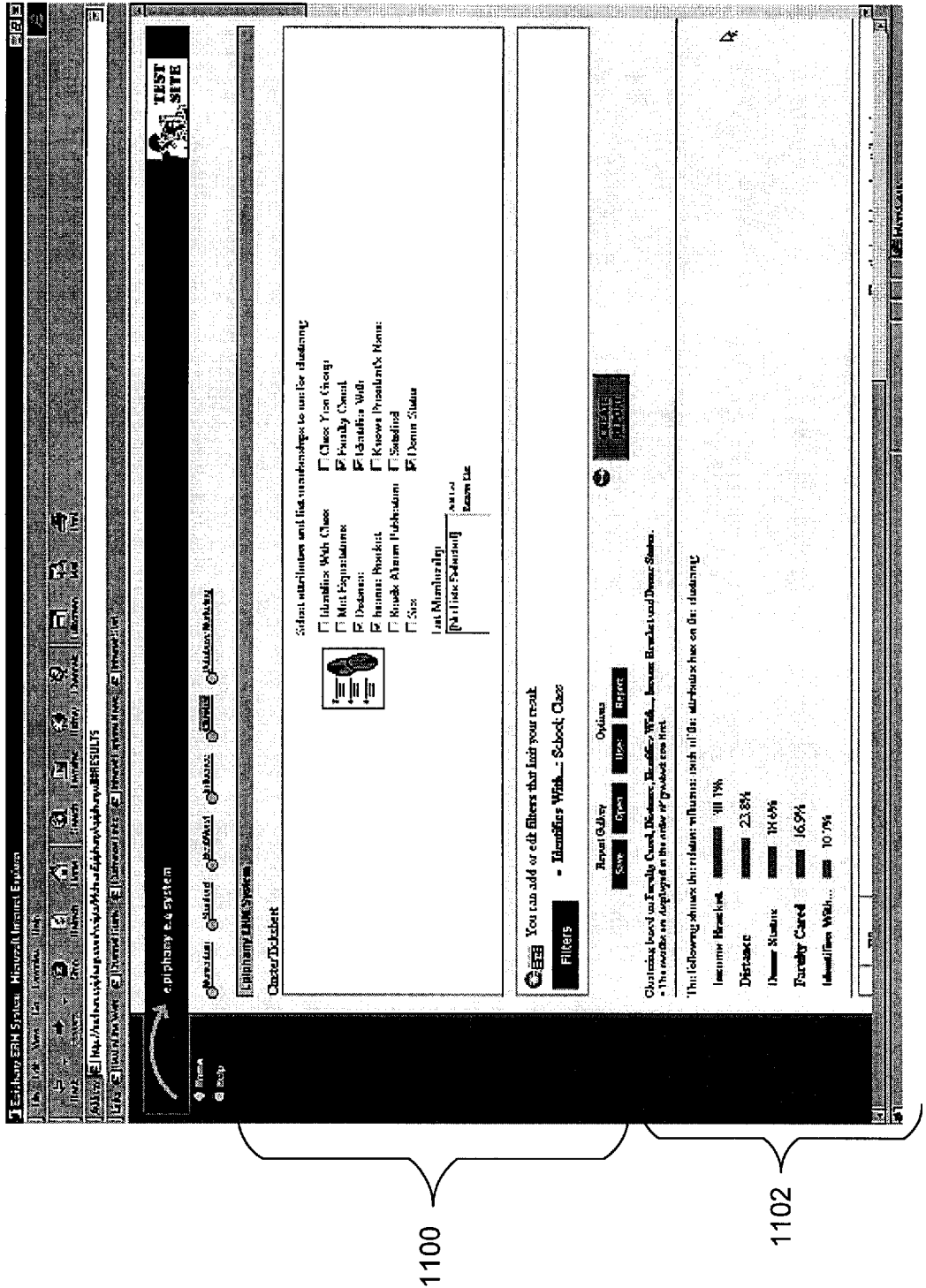

FIG. 11 shows the output displayed in the window of the web browser after the data clustering process of FIG. 5 has finished. The top portion 1100 of the document displayed in the browser window shows the options used to generate the clusters and allows easy refinement by further adjustment.

The remaining portion 1102 of the document (web browser display is scrolled to see all of it) is the output from the clustering process.

Figure 12:
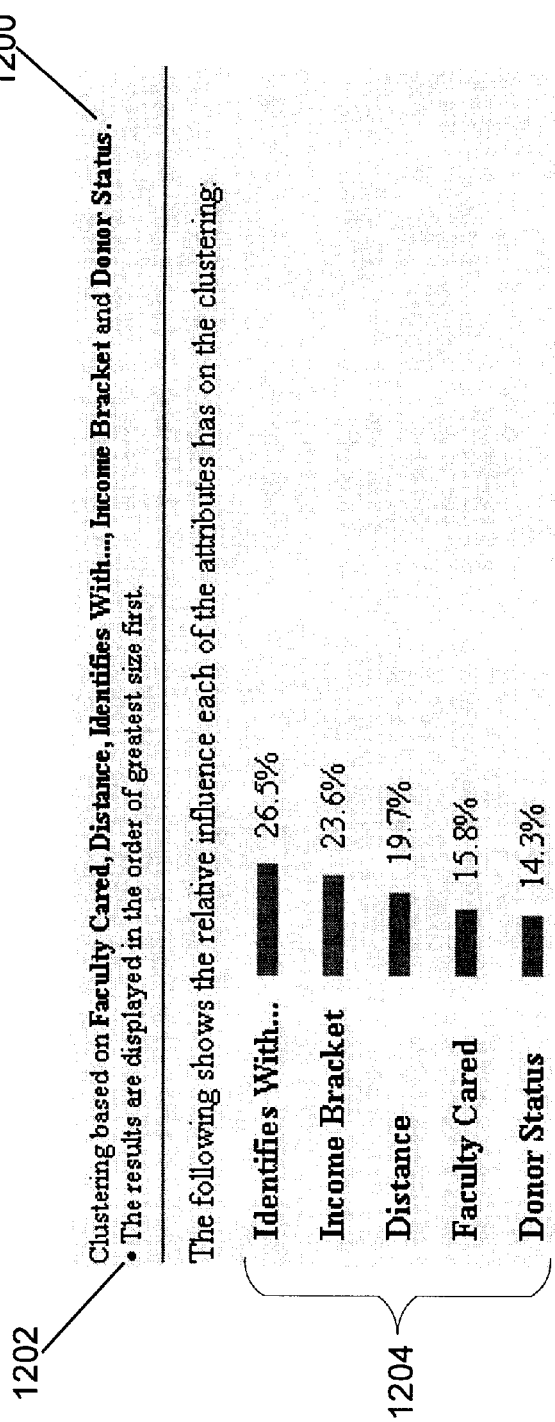

FIG. 12 shows some of the output according to one embodiment of the invention. In this example, the clustering was done without filtering the data. The first line 1200 of the output indicates the attributes on which clustering was performed. If filtering was performed, that could be indicated here as well. The line 1202 indicates information about how the results are being displayed. Here, the results are displayed in order of cluster size. Other display options may be available. In this embodiment, the full decision tree is not shown, although it could be.

The section 1204 of the output includes the relative influence of all of the clustering attributes. These values can be computed using Equation 4 at the root node of the decision tree. In this example, the identifies with attribute had the highest relative influence. Accordingly, it can be anticipated that the root node will cluster the data based on the identifies with attribute because it must have the highest influence value to have the highest relative influence.

Figure 13:
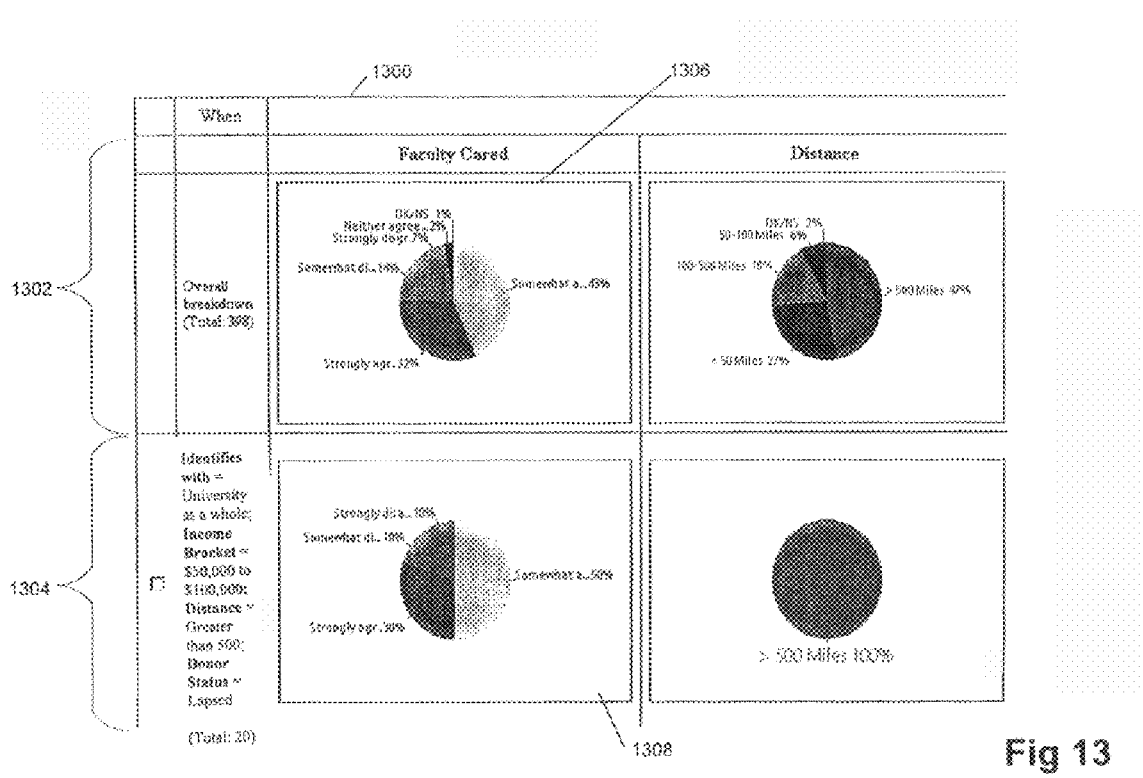

FIG. 13 shows a portion of another section of the output, the table 1300. The table 1300 follows the scheme of Table 2. There is a column in the table 1300 for each attribute in the set of data. Only the columns for the faculty cared attribute and distance attribute are shown. There is a row for each cluster and a row for the whole set of data. The row 1302 is the row with information for the whole set of data. The row 1304 is a row corresponding to one of the clusters.

Each cluster can be selected using a check box. The selected clusters can be further analyzed, or simply retrieved from the data mart for usage. Each cluster is described based on the interpretable meaning of the cluster as determined by following the path from the root node of the decision tree to the leaf node.

In this example, the root node of the decision tree is the identifies with attribute. The cluster represented in the row 1304 is reached by the following path through the decision tree: (Start) Identifies with=University as a Whole→Income Bracket=$50,000 to $100,000→Distance=Greater than 500 Miles→Donor Status=Lapsed.

In some embodiments, the cluster is described textually in the row 1304 with the start of the path at the top and the end of the path at the bottom, though the attributes need not be listed in order. Also, the number of data points in the cluster is provided as well.

The pie chart 1308 can be compared with the pie chart 1306 to see the differences in the faculty cared attribute between the cluster corresponding to the row 1304 and the set of data as whole.

This type of comparison may be helpful in identifying critical points in a system. For example, consider a set of data including data points for a call center taking sales calls. Attributes might include hold time, call time, amount purchased, repeat call, caller hung up, would buy again, etc. Looking at the pie charts, it might be clear that hold time has a significant effect on whether people would buy again. This information can be used to refine the process, adjust the number of call center operators, etc.

Also, the report could include a decision tree such as the decision tree of FIG. 6.

D. Alternative Embodiments

In the forgoing examples, all of the attributes were highly discrete. Further, attributes such as age, income, etc., had already been further discretized into brackets. The approach can be extended to handle less discrete data, e.g. integers, and non-discrete attributes, e.g. real numbers. One approach is to discretize those attributes. This can be done manually or in an automated fashion.

The manual approach involves defining the brackets and creating an additional attribute in the data set, or a temporary attribute. For example, a set of census data might include an age attribute. An additional attribute called age bracket could be added, or stored in a temporary table, that includes ten years at a time, e.g. <10, 10–19, etc. Alternatively, the age bracket attribute can be further divided. For example, in a study of the elderly, the age brackets being used might be different from the age brackets for a study of the general population.

Another approach is to use an automated system to discretize, or further discretize, an attribute. One approach is to simply bin the values into b equally sized brackets, or use mixture modeling to determine where bracket boundaries should be placed.

In some embodiments, programs for clustering and accessing the set of data are included in one or more computer usable media such as CD-ROMs, floppy disks, or other media.

Some embodiments of the invention are included in an electromagnetic wave form. The electromagnetic wave form comprises information such as clustering programs and programs for allowing a web browser to interact with the clustering programs over a network. The electromagnetic waveform might include the clustering programs accessed over a network.

E. Conclusion

Accordingly, a method and apparatus for generating clusters from a set of data has been defined. The method produces a decision tree that can be used to interpret the contents of the clusters in meaningful terms. Further, the path from the root of the decision tree to a cluster defines an SQL query that can easily be used to retrieve the matching data. The method is domain independent because no similarity, or distance function is required. The method is highly scalable to large data sets and does not require repeated accesses to the set of data. The method operates in O(n) time when the CUBE operation is available for accessing the set of data.

The foregoing description of various embodiments of the invention have been presented for purposes of illustration and description. It is not intended to limit the invention to the precise forms disclosed. Many modifications and equivalent arrangements will be apparent.

What is claimed is:

1. A business method for creating an apparatus for determining a corporate strategy, the method comprising:

retrieving data values for attributes from a set of data;

computing pair-wise influences among attributes based on a distribution of all remaining attributes using the retrieved data values;

selecting an attribute on which to form a branch in a decision tree for clustering based on the computed pair-wise influences;

iterating through said selecting and said computing until a stopping condition is detected;

when the stopping condition is detected, identifying one or more clusters, wherein each cluster corresponds to a node in the decision tree, and wherein each cluster is comprised of a subset of the set of data as defined by a corresponding node in the decision tree; and displaying the one or more clusters in a visual format to assist a user in setting corporate strategy.

2. The method of claim 1, wherein the data is retrieved using a CUBE operation that results in data comprising frequency information for the attributes.

3. The method of claim 1, wherein the data is retrieved using a GROUP BY operation.

4. The method of claim 1, further comprising:

eliminating one or more attributes based on user input.

5. The method of claim 1, further comprising:

eliminating one or more attributes to obtain a set of k attributes based on uniformity of distribution of values of the attribute.

6. The method of claim 5, wherein eliminating further comprises:

computing an entropy for each attribute; and retaining in the set of attributes the k attributes with the lowest entropy.

7. The method of claim 1, wherein a user interface is provided.

8. The method of claim 7, further comprising:

displaying a list of attributes; and receiving user input of a selection of attributes for which data is to be retrieved.

9. The method of claim 7, further comprising:

displaying filter data; and receiving user input of a selection of attributes and attribute values used to filter the set of data before data is retrieved.

10. The method of claim 7, further comprising:

determining how many clusters are to be output based on user input.

11. The method of claim 7, further comprising:

determining whether to display the output in a chart based on user input.

12. The method of claim 7, further comprising:

eliminating one or more attributes based on user input.

13. The method of claim 7, further comprising:

outputting only clusters based on a number of data points in the cluster.

14. The method of claim 7, further comprising:

performing subsetting in response to user input.

15. The method of claim 1, wherein computing the pair-wise influences among attributes further comprises:

computing the mutual information of pairs of attributes in the set of attributes.

16. The method of claim 1, further comprising creating a subset from a node in the decision tree for clustering, wherein creating the subset comprises:

identifying a first attribute, the first attribute having a first highest influence;

selecting a second attribute in the set of attributes, the second attribute having a high mutual influence with respect to the first attribute;

computing a set of vectors for each value of the first attribute, wherein each vector is comprised of a probability of each value of the second attribute;

computing a Bhattacharyya distance between each pair of vectors; and forming a subset if the Bhattacharyya distance between a pair of vector exceeds a predetermined amount.

17. The method of claim 1, wherein a path from a root node in the decision tree for clustering to a leaf node identifies a structured query language (SQL) query for retrieving a corresponding cluster from the set of data.

18. The method of claim 1, wherein influence is computed with $$Influence(x_i) = \sum_{j \ne i} MI(x_i, x_j),$$

$$\text{where } MI(X_i, X_j) = \sum_{y,z} P(x_{i,} = y, x_j = z) \log \frac{P(x_i = y, x_j = z)}{P(x_i = y)P(x_j = z)},$$

where $y \in$ {attribute values of $x_i$} and $z \in$ {attribute values of $x_j$}.

19. The method of claim 1, wherein each node corresponding to a cluster comprises a leaf node of the decision tree for clustering.

20. A system for creating an apparatus for determining a corporate strategy, the system comprising:

a computer, and a computer program executable by the computer, the computer program comprising computer instructions for:

retrieving data values for attributes from the set of data;

computing pair-wise influences among attributes based on a distribution of all remaining attributes using the retrieved data values;

selecting an attribute on which to form a branch in a decision tree for clustering based on the computed pair-wise influences;

iterating through said compute instructions and said select instructions until a stopping condition is detected;

when the stopping condition is detected, identifying one or more clusters, wherein each cluster corresponds to a node in the decision tree, and wherein each cluster is comprised of a subset of the set of data as defined by its corresponding node in the decision tree; and displaying the one or more clusters in a visual format to assist a user in setting corporate strategy.

21. The system of claim 20, wherein the data is retrieved using a CUBE operation that results in data comprising frequency information for the attributes.

22. The system of claim 20, wherein the data is retrieved using a GROUP BY operation.

23. The system of claim 20, wherein the computer program further comprises:

eliminating one or more attributes based on user input.

24. The system of claim 20, wherein the computer program further comprises:

eliminating one or more attributes to obtain a set of k attributes based on uniformity of distribution of values of the attribute.

25. The system of claim 24, wherein the computer program to perform eliminating further comprises:

computing an entropy for each attribute; and retaining in the set of attributes the k attributes with the lowest entropy.

26. The system of claim 20, wherein a user interface is provided.

27. The system of claim 26, wherein the computer program further comprises:

displaying a list of attributes; and receiving user input of a selection of attributes for which data is to be retrieved.

28. The system of claim 26, wherein the computer program further comprises:

displaying filter data; and receiving user input of a selection of attributes and attribute values used to filter the set of data before data is retrieved.

29. The system of claim 26, wherein execution of the computer program further comprises:

determining how many clusters are to be output based on user input.

30. The system of claim 26, wherein the computer program further comprises:

determining whether to display the output in a chart based on user input.

31. The system of claim 26, wherein the computer program further comprises:

eliminating one or more attributes based on user input.

32. The system of claim 26, wherein the computer program further comprises:

outputting only clusters based on a number of data points in the cluster.

33. The system of claim 26, wherein the computer program further comprises:

performing subsetting in response to user input.

34. The system of claim 20, wherein the computer program to compute the pair-wise influences among attributes includes further comprises:

computing mutual information of pairs of attributes in the set of attributes.

35. The system of claim 20, wherein the computer program further comprises creating a subset from a node in the decision tree for clustering, wherein the computer program to create the subset comprises:

identifying a first attribute, the first attribute having a first highest influence;

selecting a second attribute in the set of attributes, the second attribute having a high mutual influence with respect to the first attribute;

computing a set of vectors for each value of the first attribute, wherein each vector is comprised of a probability of each value of the second attribute;

computing a Bhattacharyya distance between each pair of vectors; and forming a subset if the Bhattacharyya distance between a pair of vector exceeds a predetermined amount.

36. The system of claim 20, wherein a path from a root node in the decision tree for clustering to a leaf node identifies a structured query language (SQL) query for retrieving a corresponding cluster from the set of data.

37. The system of claim 20, wherein the computer program computes influence with $$Influence(x_i) = \sum_{j \neq i} MI(x_i, x_j),$$

where $MI(X_i, X_j) = \sum_{y,z} P(x_i = y, x_j = z) \log \frac{P(x_i = y, x_j = z)}{P(x_i = y)P(x_j = z)}$, where $y \in \{$attribute values of $x_i\}$ and $z \in \{$attribute values of $x_j\}$.

38. The system of claim 20, wherein each node corresponding to a cluster comprises a leaf node of the decision tree for clustering.

39. A computer-readable storage medium encoded with software instructions adapted to be executed by a processor, the instructions comprising:

retrieving data values for attributes from the set of data;

computing pair-wise influences among attributes based on a distribution of all remaining attributes using the retrieved data values;

selecting an attribute on which to form a branch in a decision tree for clustering based on the computed pair-wise influences;

iterating through the retrieving steps and the selecting steps until a stopping condition is detected;

when the stopping condition is detected, identifying one or more clusters, wherein each cluster corresponds to a node in the decision tree for clustering, and wherein each cluster is comprised of a subset of the set of data as defined by its corresponding node in the decision tree for clustering; and displaying the one or more clusters in a visual format to assist a user in setting corporate strategy.

40. The computer-readable storage medium of claim 39, wherein the data is retrieved using a CUBE operation that results in data comprising frequency information for the attributes.

41. The computer-readable storage medium of claim 39, wherein the data is retrieved using a GROUP BY operation.

42. The computer-readable storage medium of claim 39, wherein the instructions further comprise:

eliminating one or more attributes based on user input.

43. The computer-readable storage medium of claim 39, wherein the instructions further comprise:

eliminating one or more attributes to obtain a set of k attributes based on uniformity of distribution of values of the attribute.

44. The computer-readable storage medium of claim 43, wherein the instructions further comprise:

computing an entropy for each attribute; and retaining in the set of attributes the k attributes with the lowest entropy.

45. The computer-readable storage medium of claim 39, wherein a user interface is provided.

46. The computer-readable storage medium of claim 45, wherein the instructions further comprise:

displaying a list of attributes; and receiving user input of a selection of attributes for which data is to be retrieved.

47. The computer-readable storage medium of claim 45, wherein the instructions further comprise:

displaying filter data; and receiving user input of a selection of attributes and attribute values used to filter the set of data before data is retrieved.

48. The computer-readable storage medium of claim 45, wherein the instructions further comprise:

determining how many clusters are to be output based on user input.

49. The computer-readable storage medium of claim 45, wherein the instructions further comprise:

determining whether to display the output in a chart based on user input.

50. The computer-readable storage medium of claim 45, wherein the instructions further comprise:

eliminating one or more attributes based on user input.

51. The computer-readable storage medium of claim 45, wherein the instructions further comprise:

outputting only clusters based on a number of data points in the cluster.

52. The computer-readable storage medium of claim 45, wherein the instructions further comprise:

performing subsetting in response to user input.

53. The computer-readable storage medium of claim 39, wherein the instructions further comprise:

computing the mutual information of pairs of attributes in the set of attributes.

54. The computer-readable storage medium of claim 39, wherein the instructions further comprise creating a subset from a node in the decision tree for clustering, and wherein the instructions to create the subset further comprises:

identifying a first attribute, the first attribute having a first highest influence;

selecting a second attribute in the set of attributes, the second attribute having a high mutual influence with respect to the first attribute;

computing a set of vectors for each value of the first attribute, wherein each vector is comprised of a probability of each value of the second attribute;

computing a Bhattacharyya distance between each pair of vectors; and forming a subset if the Bhattacharyya distance between a pair of vector exceeds a predetermined amount.

55. The computer-readable storage medium of claim 39, wherein a path from a root node in the decision tree for clustering to a leaf node identifies a structured query language (SQL) query for retrieving a corresponding cluster from the set of data.

56. The computer-readable storage medium of claim 39, wherein the instructions to compute influence includes the equation $$Influence(x_i) = \sum_{j \neq i} MI(x_i, x_j),$$

where $MI(X_i, X_j) = \sum_{y,z} P(x_i = y, x_j = z) \log \frac{P(x_i = y, x_j = z)}{P(x_i = y)P(x_j = z)}$, where $y \in$ {attribute values of $x_i$} and $z \in$ {attribute values of $x_j$}.

57. The computer-readable storage medium of claim 39, wherein each node corresponding to a cluster comprises a leaf nods of the decision tree for clustering.

58. A system for creating a data filter for determining a corporate strategy, the system comprising:

(a) means for retrieving data values for attributes from the set of data;

(b) means for computing pair-wise influences among attributes based on a distribution of all remaining attributes using the retrieved data values;

(c) means for selecting an attribute on which to form a branch in a decision tree for clustering based on the computed pair-wise influences;

(d) means for iterating through acts (b) and (c) until a stopping condition is detected;

(e) means for, when the stopping condition is detected, identifying one or more clusters, wherein each cluster corresponds to a node in the decision tree for clustering, and wherein each cluster is comprised of a subset of the set of data as defined by its corresponding node in the decision tree for clustering; and means for displaying the one or more clusters in a visual format to assist a user in setting corporate strategy.

59. The system of claim 58, further comprising means for computing influence with $$Influence(x_i) = \sum_{j \neq i} MI(x_i, x_j),$$

where $MI(X_i, X_j) = \sum_{y,z} P(x_i = y, x_j = z) \log \frac{P(x_i = y, x_j = z)}{P(x_i = y)P(x_j = z)}$, where $y \in$ {attribute values of $x_i$} and $z \in$ {attribute values of $x_j$}.

* * * * *